(12) United States Patent
Fleischman et al.

(10) Patent No.: US 7,080,668 B2
(45) Date of Patent: Jul. 25, 2006

(54) ADAPTER FOR DISPENSING LIQUID INTO A CONTAINER

(75) Inventors: Scott G. Fleischman, Palmetto, FL (US); Neal B. Martinez, Maderia Beach, FL (US)

(73) Assignee: Honeywell International Inc., Morristown, NJ (US)

( * ) Notice: Subject to any disclaimer, the term of this patent is extended or adjusted under 35 U.S.C. 154(b) by 62 days.

(21) Appl. No.: 10/807,653

(22) Filed: Mar. 24, 2004

(65) Prior Publication Data

US 2005/0211330 A1     Sep. 29, 2005

(51) Int. Cl.
*B65B 1/04* (2006.01)
(52) U.S. Cl. .............. 141/2; 141/18; 141/286
(58) Field of Classification Search ......... 141/286, 141/301, 2, 18; 222/212, 422, 486, 536
See application file for complete search history.

(56) References Cited

U.S. PATENT DOCUMENTS

| 2,121,673 | A |   | 6/1938  | White              |
|-----------|---|---|---------|--------------------|
| 3,151,468 | A |   | 10/1964 | Martin             |
| 3,687,176 | A | * | 8/1972  | Fernandes et al. ............ 141/59 |
| 4,027,791 | A | * | 6/1977  | Samuels ............ 222/396 |
| 4,201,319 | A | * | 5/1980  | Andera et al. ............ 222/396 |
| 4,871,087 | A | * | 10/1989 | Johnson ............ 222/1 |
| 5,438,837 | A |   | 8/1995  | Caldwell et al.    |
| 6,035,646 | A |   | 3/2000  | Griswold           |
| 2003/0070718 | A1 | | 4/2003 | Benham             |

FOREIGN PATENT DOCUMENTS

| DE | 202 11 056 U1 | 11/2002 |
| WO | WO 02/055924 A1 | 7/2002 |

* cited by examiner

*Primary Examiner*—Steven O. Douglas
(74) *Attorney, Agent, or Firm*—Fogg & Associates, LLC; David N. Fogg

(57) ABSTRACT

An adaptor for dispensing a liquid into a container is provided. The adaptor includes a sleeve having an outer surface and an inner surface. The adapter also includes an opening passing through the outer surface and inner surface of the sleeve. The adapter further includes a pipe having a first and a second end, the first end attached to the opening. The adapter also includes a sealing lid removably disposed over the second end of the pipe.

27 Claims, 3 Drawing Sheets

ADAPTER FOR DISPENSING LIQUID INTO A CONTAINER

TECHNICAL FIELD

The present invention relates generally to the field of containers of liquids and, in particular, to an adapter for dispensing liquids into a container.

BACKGROUND INFORMATION

A dewar flask is a vessel for storing hot or cold liquids so that the liquids maintain their temperature independent of the surroundings. Typically, the walls of the dewar flask include two thin layers separated by a vacuum to reduce conduction and convection.

In one application, the dewar flask is used to store liquids, such as, liquid nitrogen, for use in various chemical processes. A dewar head assembly is often used to remove liquid from the dewar flask. The dewar head assembly typically includes a long pipe that extends through an opening at the top of the dewar flask. The dewar head assembly also typically includes a mechanism for controllably removing the chemical from the dewar flask through the pipe.

When used in a chemical process, the liquid in the dewar flask occasionally becomes depleted and must be replenished. During conventional refilling of the flask the dewar head assembly is removed from the dewar flask. Unfortunately, the character of liquids, such as nitrogen is such that the extreme cold of the dewar flask causes condensation to form on the dewar head assembly when removed from the dewar flask introducing environmental contamination, namely water to drip into the dewar flask. Introduction of water into the dewar flask may cause long term problems to equipment associated with the dewar flask. Also, this introduction of contaminants into the dewar flask may also affect the reliability of the equipment associated with the dewar flask. In an attempt to minimize this contamination, a procedure of towel drying, hot air drying and dry nitrogen drying of the pipe of the dewar head assembly is typically used. Unfortunately, the time to conduct this procedure is on the order of 30 minutes for each refill of the dewar flask.

The procedure of reinsertion of the dewar head after the dewar flask is refilled is also affected by the measures used to protect the contents of the dewar flask from contamination. Insertion of a dewar head assembly normally takes about 5 minutes. A much longer period of time is required after the drying of the pipe of the dewar head assembly because the dewar head assembly is warm compared to the liquid nitrogen. When the dewar head assembly is warm, the liquid nitrogen tends to splash on the person inserting the dewar head assembly if inserted too quickly and thereby raising a safety issue. Thus, the dewar head assembly is typically inserted slowly. This also raises a health/disability issue for the operator as a result of holding the dewar head assembly for an extended period of time.

Therefore, there is a need in the art for an improved technique for dispensing liquid into a dewar flask.

SUMMARY OF THE INVENTION

Embodiments of the present invention address problems with dispensing liquids into a container. In one embodiment, an adapter is provided that comprises a sleeve having an outer surface and an inner surface and an opening passing through the outer surface and inner surface of the sleeve and a pipe having a first and a second end with the first end attached to the opening and a sealing lid removably disposed over the second end of the pipe.

DETAILED DESCRIPTION

In the following detailed description of the preferred embodiments, reference is made to the accompanying drawings that from a part hereof, and in which is shown by way of illustration specific embodiments in which the invention may be practiced. It is to be understood that other embodiments may be utilized and structural changes may be made without departing from the scope of the present invention.

Figure 1:
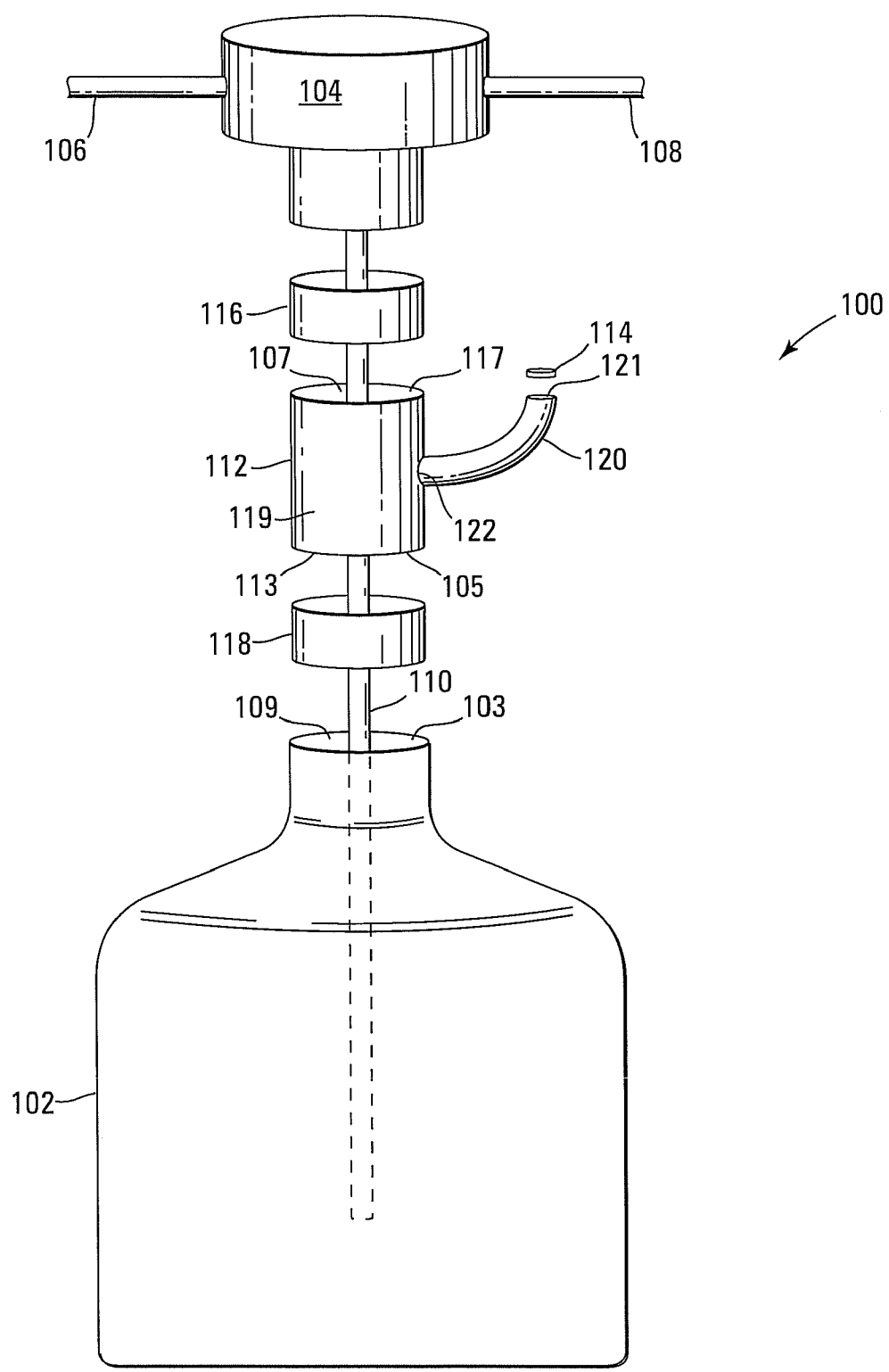
FIG. 1 is an exploded, perspective view of one embodiment of a liquid dispensing system.

FIG. 1 is an illustration of one embodiment of a liquid dispensing system shown generally at 100 and constructed according to the teachings of the present invention. In the embodiment illustrated in FIG. 1, a container 102, e.g., a dewar flask, is used to store liquids such as liquid nitrogen. An adapter 112 is removably attached between the opening 109 of the container 102 and an assembly 104, e.g., a dewar head assembly. Advantageously, adapter 112 allows liquid to be dispensed into container 102 without requiring the removal and reinsertion of assembly 104.

Adapter 112 is formed of a hollow sleeve 119 and a pipe 120. In one embodiment, sleeve 119 and pipe 120 comprise one of stainless steel and aluminum. In other embodiments, sleeve 119 and pipe 120 are made from any other appropriate material. The particular material used, in one embodiment, is selected to be compatible with the material used for the container 102 or the particular liquid held in the container 102.

Sleeve 119 includes a first opening 107 that is adapted to interface with assembly 104. Sleeve 119 also includes a second opening 105, opposite first opening 107 that is adapted to interface with the container 102. A channel 117 passes between the first opening 107 and the second opening 105. In one embodiment, sleeve 119 comprises a cylindrical sleeve with openings 107 and 105 being generally circular in shape. The shape of the openings 105 and 107 is typically selected to define a channel with a cross sectional area that is substantially the same as the opening 109 of container 102.

One end of pipe 120 is attached at an opening 122 of the adapter 112. Pipe 120 is in fluid communication with channel 117 of adapter 112. Various embodiments of pipe 120 are shown and described with respect to FIGS. 5, 6, 7 and 8, below. Further, one embodiment of a sleeve 119 is shown by way of example in sleeve 400 of FIG. 4.

Adapter 112 is removably attached to container 102 with flange clamp 118. The flange clamp 118 engages flange 103 of container 102 and flange 105 of adapter 112. When engaged, flange clamp 118 forms an air-tight seal between flange 103 of container 102 and flange 105 of adapter 112. One embodiment of flange clamp 118 is depicted with flange clamp 118' of FIG. 3. In other embodiments, other appropriate mechanisms, conventional or later developed, are used to connect adapter 112 with container 102. The particular mechanism for connecting the adapter 112 to container 102 is chosen based on, for example, safety concerns, convenience, and compatibility with the container 102 and the adapter 112.

Assembly 104 includes a tube 110 for displacing liquid from the container 102. Assembly 104 also includes control interface 106 that receives signals to control the operation of assembly 104. Assembly 104 also includes output interface 108 that dispenses liquid from container 102 based on control signals received at control interface 106.

Tube 110 of assembly 104 is inserted through first opening 107 in the adapter 112 into channel 117. The assembly 104 further extends through opening 109 of container 102. The assembly 104 is attached to the adapter 112 to form an air-tight seal using a flange clamp 116. One embodiment of flange clamp 116 is shown by way of example with flange clamp 116' of FIG. 2. A removable seal 114 is used to cover the end 121 of the pipe 120.

In operation, adapter 112 allows liquid to be dispensed into container 102 without removing assembly 104. The adapter 112 is secured to the container 102 to form an air-tight seal between adapter 112 and container 102 using the flange clamp 118. The tube 110 connected to the assembly 104 is inserted into the channel 117 of the adapter 112 and into the container 102. The assembly 104 is aligned with the top edge of the adapter 112. The assembly 104 and adapter 112 is sealed air-tight using a flange clamp 116. The seal 114 on the pipe 120 is removed. In one embodiment the liquid to be dispensed is poured into the pipe 120. Once the container 102 receives the required amount of liquid, it is dispensed through the assembly 104 via the tube 110. When more liquid is needed, it is dispensed into container 102 through adapter 112 without removing assembly 104. The above method is convenient in that the assembly 104 need not be removed every time the container 102 has to be filled. This reduces the risk of environmental contamination to the stored liquid and also reduces the stress and strain on the worker using the container 102.

Figure 2:
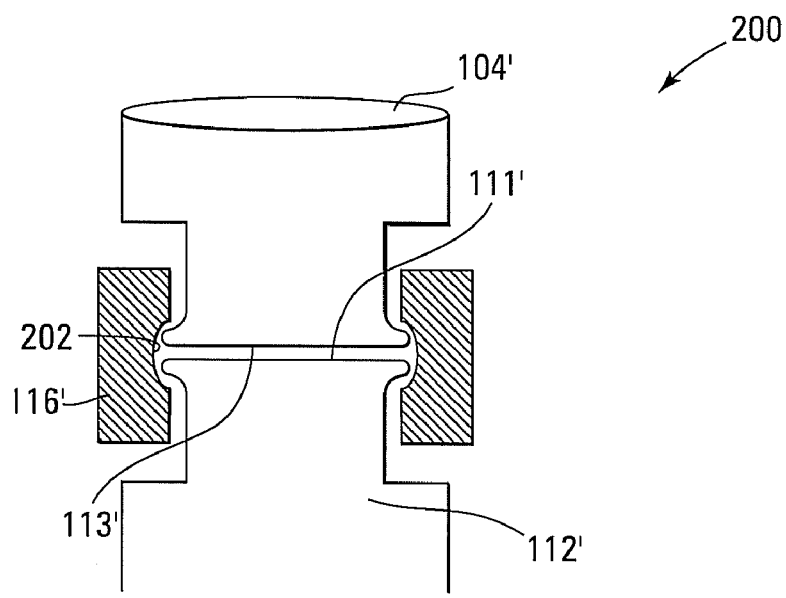
FIG. 2 is a side view in partial cross section of one embodiment of a flange clamp used to seal together the edges of a dewar head and an adapter in a liquid dispensing system.

FIG. 2 is an illustration of one embodiment of the flange clamp 116'. The flange clamp 116' engages flange 113' of the assembly 104 and 111' of the adapter 112'. The flange clamp 116' has a notch 202 in the interior surface. The notch 202 overlaps both the flange 113' of the assembly 104 and the flange 111' of the adapter 112'. The flange clamp 116' seals the assembly 104' and the adapter 112' together air-tight.

Figure 3:
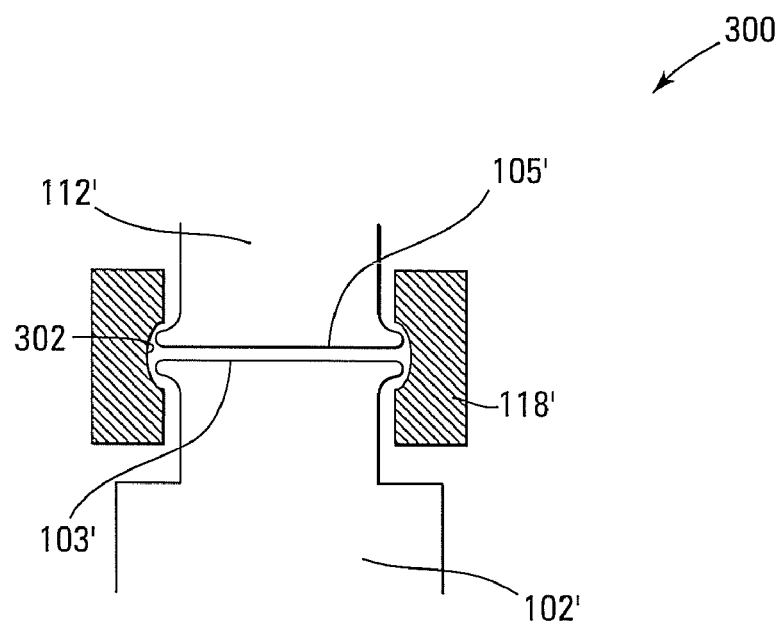
FIG. 3 is a side view in partial cross section of one embodiment of a flange clamp used to seal together the edges of an adapter and a dewar in a liquid dispensing system.

FIG. 3 is an illustration of one embodiment of flange clamp 118'. The flange clamp 118' engages flange 103' of the container 102 and 105' of the adapter 112'. The flange clamp 118' has a notch 302 in the interior surface. The notch 302 overlaps both the flange 103' of the container 102' and the flange 105' of the adapter 112'. The flange clamp 118' seals the adapter 112' and the container 102' together air-tight.

Figure 4:
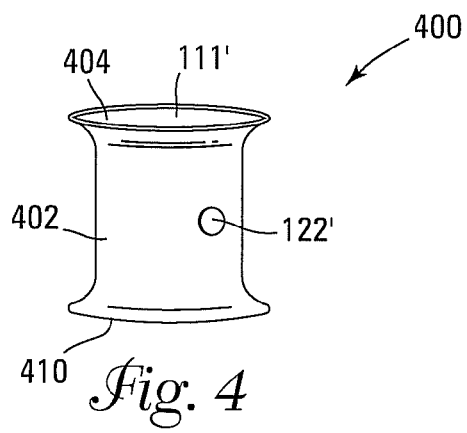
FIG. 4 is a perspective view of one embodiment of an adapter sleeve for a liquid dispensing system.

FIG. 4 is an illustration of one embodiment of a sleeve 400 for use in system 100 of FIG. 1. The sleeve 400 has an outer surface 402 and an inner surface 404. An opening 122' goes through the sleeve 400 from the outer surface 402 to the inner surface 404. The sleeve 400 is lengthwise sufficiently long to include an opening 122'. Typically, the opening 122' is placed halfway along the length of the sleeve. The opening 122' is sealed air tight to the pipe 120 shown in FIG. 1 such that the pipe is in fluid communication with the passageway formed by the inner surface 404. The sleeve 400 has the top flange 111' that is used to connect to the assembly 104 in FIG. 1, e.g., a dewar head assembly. The sleeve also has a bottom flange 105' used to connect to the container 102 in FIG. 1, e.g., a dewar flask. In one embodiment, the sleeve is cylindrical in shape. In another embodiment, the sleeve is made of aluminum or stainless steel.

The following FIGS. 5, 6, 7 and 8 illustrate various embodiments for the pipe 120 shown in FIG. 1.

Figure 5:
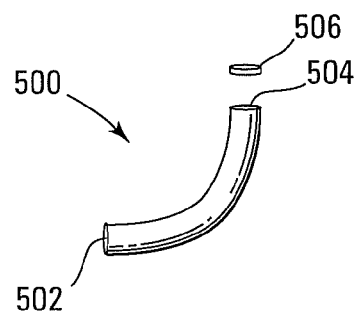
FIG. 5 is a perspective view of one embodiment of a curved pipe that connects to an adapter sleeve to form an adapter.

FIG. 5 is an illustration of one embodiment of a pipe 500. The pipe 500 is curved upwards in shape. The pipe 500 has a bottom end 502 and a top end 504. The bottom end 502 is sealed air tight to the opening 122' of the sleeve 400 in FIG. 4 to form an adapter. The pipe 500 remains in fluid communication with the passageway formed by the inner surface of the sleeve 404. The top end 504 of the pipe 500 is used to dispense liquid into the container. A seal 506 is placed to seal end 504 of pipe 500 to reduce the risk of environmental contamination to the stored liquid in the container. The seal 506 is either a fixed, a hinged, a screwed or a removable seal.

Figure 6:
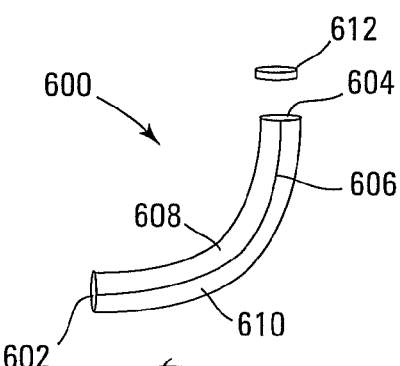
FIG. 6 is a side view in partial cross section of one embodiment of a curved pipe with a divider plate attached along the length of the pipe to form a top and bottom chamber that connects to an adapter sleeve to form an adapter.

FIG. 6 is an illustration of another embodiment of a pipe 600. The pipe 600 is curved upwards in shape. The pipe 600 has a bottom end 602 and a top end 604. The bottom end 602 is sealed air tight to the opening 122' of the sleeve 400 in FIG. 4 to form an adapter. The pipe 600 remains in fluid communication with the passageway formed by the inner surface of the sleeve 404. The pipe also has a divider plate 606 that is attached along the length of the pipe to create a top chamber 608 and a bottom chamber 610. The bottom chamber 610 is used to dispense liquid into the container 102 in FIG. 1. The top chamber 608 functions as a conduit to vent air that is displaced while dispensing liquid into the container. The top end 604 of the pipe is attached to a removable seal 612. A seal 612 is placed to reduce the risk of environmental contamination to the stored liquid in the container 102. The seal 612 is either a fixed, a hinged, a screwed or a removable seal.

Figure 7:
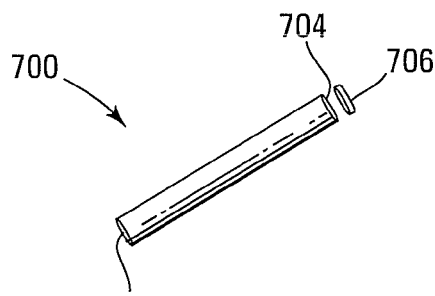
FIG. 7 is a perspective view of one embodiment of a linear pipe that connects to an adapter sleeve to form an adapter.

FIG. 7 is an illustration of another embodiment of a pipe 700. The pipe 700 is linear in shape. The pipe 700 has a bottom end 702 and a top end 704. The bottom end 702 is sealed air tight to the opening 122' of the sleeve 400 in FIG. 4 to form an adapter. The pipe 700 remains in fluid communication with the passageway formed by the inner surface of the sleeve 404. The top end 704 of the pipe is used to dispense liquid into the container. A seal 706 is placed to reduce the risk of environmental contamination to the stored liquid in the container. The seal 706 is either a fixed, a hinged, a screwed or a removable seal.

Figure 8:
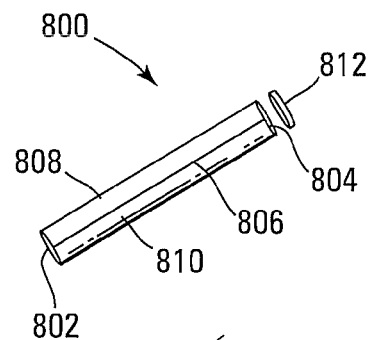
FIG. 8 is a side view in partial cross section of one embodiment of a linear pipe with a divider plate attached along the length of the pipe to form a top and bottom chamber that connects to an adapter sleeve to form an adapter.

FIG. 8 is an illustration of another embodiment of a pipe 800. The pipe 800 is linear in shape. The pipe 800 has a bottom end 802 and a top end 804. The bottom end 802 is sealed air tight to the opening 122' of the sleeve 400 in FIG. 4 to form an adapter. The pipe 800 remains in fluid communication with the passageway formed by the inner surface of the sleeve 404. The pipe also has a divider plate 806 that is attached along the length of the pipe to create a top chamber 808 and a bottom chamber 810. The bottom chamber 810 is used to dispense liquid into the container 102 in FIG. 1. The top chamber 808 functions as a conduit to vent air that is displaced while dispensing liquid into the container. The top end 804 of the pipe is attached to a removable seal 812. A seal 812 is placed to reduce the risk of environmental contamination to the stored liquid in the container 102. The seal 812 is either a fixed, a hinged, a screwed or a removable seal.

CONCLUSION

Embodiments of the present invention have been described. The embodiments provide an adaptor for dispensing liquid into a container. The embodiments drastically limit environmental contamination of the liquid in the container. In addition, using the embodiments eliminates safety and health/disability issues related to dispensing a liquid e.g., liquid nitrogen into a container, e.g., a dewar flask. Using an embodiment of the adapter is a faster process which results in a considerable amount of time saving as a result.

Although specific embodiments have been illustrated and described in this specification, it will be appreciated by those of ordinary skill in the art that any arrangement that is calculated to achieve the same purpose may be substituted for the specific embodiment shown. This application is intended to cover any adaptations or variations of the present invention.

What is claimed is:

1. An adaptor for dispensing a liquid into a container, the adaptor comprising:
   a sleeve having an outer surface and an inner surface;
   an opening passing through the outer surface and inner surface of the sleeve;
   a pipe having a first and a second end, the first end attached to the opening;
   a divider plate disposed in the pipe and passing between the first end and the second end of the pipe; and
   a sealing lid removably disposed over the second end of the pipe.

2. The adapter of claim 1, wherein the divider plate is attached along the length of the pipe to create a top and a bottom chamber in the pipe.

3. The adapter of claim 2, wherein the top and bottom chambers of the pipe are substantially similar in size.

4. The adapter of claim 1, wherein the inner surface of the sleeve forms a channel with a cross sectional area that is substantially the same as an opening in the container.

5. The adapter of claim 4, wherein the cross sectional area of the channel is substantially circular in shape.

6. The adapter of claim 1, wherein the sleeve comprises one of stainless steel and aluminum.

7. The adapter of claim 1, wherein the sleeve is cylindrical in shape.

8. The adapter of claim 1, wherein the sleeve is adapted to make a seal with a dewar flask.

9. The adapter of claim 4, where in the channel is adapted to receive a dewar head assembly.

10. A system for dispensing a liquid comprising:
    a container;
    an adapter for dispensing liquid into the container, the adapter comprising:
    a sleeve having an outer surface and an inner surface;
    an opening passing through the outer surface and the inner surface of the sleeve;
    a pipe having a first end and a second end, the first end attached to the opening and die second end adapted to receive liquid into the container;
    a sealing lid removably disposed over the second end of the pipe; and
    an assembly for dispensing liquid from the container; and
    wherein the adapter is in fluid communication with the container and the assembly.

11. The system of claim 10, wherein the container is a dewar flask.

12. The system of claim 10, wherein the adapter further comprising a divider plate disposed in the pipe and passing between the first end and the second end of the pipe.

13. The system of claim 12, wherein the divider plate is attached along the length of the pipe to create a top and a bottom chamber in the pipe.

14. The system of claim 13, wherein the top and bottom chambers of the pipe are substantially similar in size.

15. The system of claim 10, wherein the assembly is connected to an electrical interface and an output interface.

16. The system of claim 10, wherein the sleeve comprises one of stainless steel and aluminum.

17. The system of claim 10, wherein the sleeve is adapted to make a seal with a dewar flask.

18. The system of claim 10, wherein the inner surface of the sleeve forms an opening that is adapted to receive a dewar head assembly.

19. The system of claim 18, where in the sleeve has a second opening, opposite the first opening that is substantially the same size as the first opening of the container.

20. The system of claim 10, wherein a first end of the adapter is sealed to a dewar flask and a second end of the adapter is sealed to a dewar head assembly.

21. A method for dispensing a liquid into a container, the method comprising:
    securing an adapter to the container, the adapter having a sleeve with an outer surface and an inner surface defining a channel and a pipe in fluid communication with the channel;
    inserting a pipe of an assembly into the channel of the adapter and the container;
    securing the assembly to adapter;
    pouring the liquid into the container through the pipe of to adapter.

22. The method of claim 21, wherein securing the adapter to the container comprises forming an airtight seal between the adapter and the container.

23. The method of claim 21, wherein securing the assembly to the adapter comprises forming an airtight seal between the assembly and the adapter.

24. The method of claim 21, and further comprising removing a sealing lid prior to pouring of the liquid into the container.

25. The method of claim 21, wherein air is vented from the container via a top chamber in the pipe of the adapter while pouring the liquid into the container through a bottom chamber of the pipe.

26. A method for dispensing liquid from a container, the method comprising:
    securing an adapter to the container, the adapter having a sleeve with an outer surface and an inner surface defining a channel and a pipe in fluid communication with to channel;
    inserting a pipe of an assembly into the channel of the adapter and the container;
    securing the assembly to adapter;
    pouring a liquid into the container through the pipe of the adapter;
    dispensing the liquid through the assembly; and
    pouring additional liquid into the container through die pipe of the adapter without removing the assembly.

27. The method of claim 26, and further comprising maintaining a sealing lid is in place while dispensing the liquid through the assembly.

* * * * *

UNITED STATES PATENT AND TRADEMARK OFFICE
CERTIFICATE OF CORRECTION

PATENT NO.        : 7,080,668 B2                                     Page 1 of 1
APPLICATION NO. : 10/807653
DATED             : July 25, 2006
INVENTOR(S)       : Fleischman et al.

It is certified that error appears in the above-identified patent and that said Letters Patent is hereby corrected as shown below:

At Claim 19, Column 6, line 18 replace "where in" with --wherein--
At Claim 26, Column 6, line 60 replace "die" with --the--
At Claim 27, Column 6, line 63 delete "is"

Signed and Sealed this

Ninth Day of January, 2007

JON W. DUDAS
*Director of the United States Patent and Trademark Office*